(12) United States Patent
Haeuptle et al.

(10) Patent No.: US 8,930,525 B2
(45) Date of Patent: Jan. 6, 2015

(54) METHOD AND APPARATUS FOR MEASURING BUSINESS TRANSACTION PERFORMANCE

(75) Inventors: Michael Haeuptle, Rocklin, CA (US); Brent A. Enck, Roseville, CA (US); Mark Sturdevant, Granite Bay, CA (US); Avi Huber, Los Altos, CA (US); Constantinos Papadopoulos, Strovolos (CY)

(73) Assignee: Hewlett-Packard Development Company, L.P., Houston, TX (US)

( * ) Notice: Subject to any disclaimer, the term of this patent is extended or adjusted under 35 U.S.C. 154(b) by 1051 days.

(21) Appl. No.: 12/768,451

(22) Filed: Apr. 27, 2010

(65) Prior Publication Data

US 2011/0264790 A1    Oct. 27, 2011

(51) Int. Cl.
*G06F 15/173* (2006.01)
*G06F 11/34* (2006.01)
*H04L 12/26* (2006.01)

(52) U.S. Cl.
CPC ............ *G06F 11/3495* (2013.01); *H04L 43/06* (2013.01); *G06F 11/3419* (2013.01); *G06F 2201/87* (2013.01); *G06F 2201/875* (2013.01)
USPC ............................ 709/224; 709/203; 709/223

(58) Field of Classification Search
CPC .............. G06F 11/349; G06F 2201/87; G06F 2201/875; H04L 43/00; H04L 43/02; H04L 43/06; H04L 43/08
USPC .................................. 709/201, 202, 203, 204
See application file for complete search history.

(56) References Cited

U.S. PATENT DOCUMENTS

| | | | | |
|---|---|---|---|---|
| 7,409,676 | B2 * | 8/2008 | Agarwal et al. ............... | 717/120 |
| 7,568,028 | B2 * | 7/2009 | Horikawa ...................... | 709/224 |
| 7,870,244 | B2 * | 1/2011 | Chong et al. .................. | 709/224 |
| 8,489,747 | B2 * | 7/2013 | Aisen et al. ................... | 709/226 |
| 2003/0195960 | A1 * | 10/2003 | Merriam ....................... | 709/224 |
| 2004/0064552 | A1 * | 4/2004 | Chong et al. .................. | 709/224 |
| 2004/0215768 | A1 * | 10/2004 | Oulu et al. .................... | 709/224 |
| 2005/0172306 | A1 * | 8/2005 | Agarwal et al. ............... | 719/328 |
| 2007/0050521 | A1 * | 3/2007 | Grove et al. .................. | 709/246 |
| 2010/0332650 | A1 * | 12/2010 | Aisen et al. ................... | 709/224 |
| 2011/0035259 | A1 * | 2/2011 | Das et al. ....................... | 705/10 |
| 2012/0143992 | A1 * | 6/2012 | Salamatov et al. ........... | 709/219 |

* cited by examiner

*Primary Examiner* — Dhairya A Patel (57) ABSTRACT

A method for measuring business transaction performance, includes the steps of, at a top-level component, assigning a correlation tag and original time stamp to a server request, passing the original time stamp with any server requests from the top-level component to one or more subsequent components, and computing an aggregate latency over a predetermined interval at the top-level component and at each subsequent component based on the original time stamp.

19 Claims, 6 Drawing Sheets

METHOD AND APPARATUS FOR MEASURING BUSINESS TRANSACTION PERFORMANCE

BACKGROUND

Business transactions conducted over a network can be evaluated in terms of latency of transaction and a number of errors encountered. These metrics then can be used to identify bottlenecks in the business transaction process and improve the overall performance of the transactions.

DESCRIPTION OF THE DRAWINGS

The Detailed Description will refer to the following Figures in which like numbers refer to like items, and in which.

DETAILED DESCRIPTION

Many business transactions are initiated over public networks, such as the Internet, but much processing of the business transaction occurs in what is traditionally known as the "backend," which may include application servers and queues, for example. Such transactions typically involve a customer making a purchase from a supplier, where the customer initiates the transaction to acquire certain goods or services, and on the backend, the supplier verifies the transaction, and then the supplier delivers the goods or services. These Internet-based business transactions typically span multiple components such JVMs or CLRs, queues and networks. These transactions can be synchronous or asynchronous. In the asynchronous case, data items are typically put in a queue and processing is performed once the component reading from the queue is ready to do so.

Examples of such transactions include stock purchases from a broker, book, DVD, or ticket purchases from an on-line retailer, hotel reservations from a hotel chain or purchasing services from an e-business. Whether a customer buys a book online or enrolls in an online course, the order event (i.e., a request) triggers a work flow of the information through multiple modules: for example, customer account management, billing, packaging and shipping, procurement, and customer service. At the backend, the request that initiates the backend processing may be referred to as a top level server request or an entry point server request. Top level or entry point server requests have different structures depending on the backend technology. Examples of top level or entry point server requests include servlets (e.g., in Java) and web services (e.g., in Windows™). For simplicity of discussion, hereafter, the top level server request will refer to the use of servlets. These servlets may be used to dynamically generate responses and return HTML content to Web browsers on the client side. Servlets often are used to validate and process HTML form submissions and control a series of user interactions in a Web application. Servlets can be used to control all aspects of the request and response exchange between a Web browser and the server. Execution in each request can generate subsequent work flows, with attendant subsequent requests. Note that for some technologies (e.g., .NET), servlets are not used.

Figure 1:
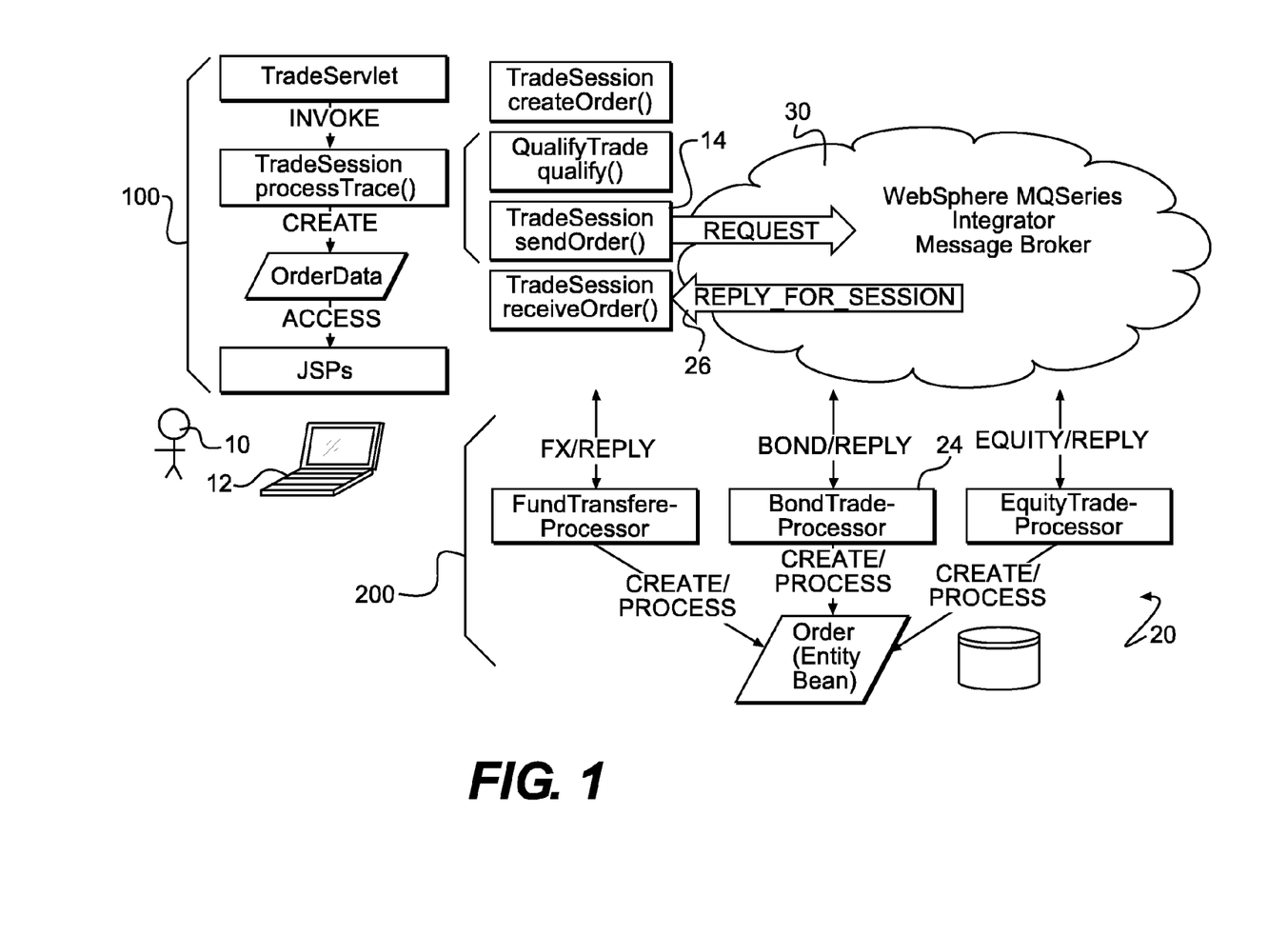
FIG. 1 illustrates a business transaction conducted over a network.

FIG. 1 illustrates a typical business transaction (i.e., a Web application) that is conducted over the Internet, in this case, a stock trading (purchase) transaction. In this stock trading business transaction, a trading application accepts trade orders from a customer and puts these orders in a queue. To meet reliability and scaling requirements, large systems may use physically separate (or dispersed) components executing on multiple machines (including virtual machines and actual machines) to process these requests and to produce responses. Thus, the trading application may include several sub-applications or routines, each of which may execute on a physically separate platform or virtual machine.

The trading application backend includes the routines for processing the order (request) and sending a reply (response) back to the customer once the order has been fulfilled. Because the trading application, like many other Internet-based applications, spans multiple components residing on different physical systems, the orders the trading application executes are made up of a chain of requests from one component to another. In this scenario, stock trading orders are processed asynchronously and it is important for the business to know the flow across the various components and the latency of the orders being processed.

In FIG. 1, a customer 10 desires to purchase publicly-traded securities from stock broker 20 and so initiates business transaction 100. The customer 10 accesses the Internet using the customer's browser 12 to connect to trading application 200 at the stock broker's Web site 30. Thus, the business transaction 100 is actually a specific instance of a stock purchase transaction enabled by the trading application 200. The customer places an order 14 (i.e., a server request) using a GUI (not shown) from the stock broker's Web site. The order 14 may provide for transfer of funds from the customer 10 to the stock broker 20. At the Web site, the server 24 processes the order 14 and sends an acknowledgement 26 to the customer 10. The actual processing of the order 14 may involve more than one step: for example, the order 14 may be sent to a first component (e.g., an application server) where the order 14 is initially processed. After this initial processing, the first application server may send a second server request to a second application server, where the order is verified. After verification, the second application server may send a third server request to a third application server, where an order confirmation is created and sent back to the customer 10. The actual transfer of the purchased stock may occur simultaneously with the acknowledgement, or at some later time. If the stock transfer occurs at the later time, the server 24 may send a transfer complete statement to the customer 10. Thus, the order 14 generates three distinct server requests. The latency of the business transaction illustrated in FIG. 1 may be the time from initiation of the order 14 to the time of actual stock transfer (i.e., at the time of acknowledgement 26 or the time of the statement). Thus, latency is all or a part of the total time of the business transaction, and may be an important factor in determining customer satisfaction and hence performance of the stock broker's stock transfer process. Customers who are dissatisfied with an on-line business transaction such as the one illustrated in FIG. 1 may not be repeat customers. Thus, business operators might want to know the latency of their business transactions to identify and correct any unnecessary delays in the process. More specifically, business operators may want to know if any bottlenecks in their system exist, the location of those bottlenecks, including on which specific hardware platform or virtual machine, and what specific routines or applications within the business transaction causes or is affected by the bottleneck.

In business transactions such as that illustrated in FIG. 1, one contributor to latency is the multiple steps required to complete the business transaction, especially where a step requires placing the specific business transaction in a queue to await processing, which is the typical asynchronous use case. For example, the business transaction of FIG. 1 contains at least three steps: order initiation, order verification, and order confirmation/delivery of the purchased stock, and each step may be performed in a physically separate component. Between each step, the specific transaction may be queued to await processing. This situation is exacerbated when many different customers access the same Web site to place stock orders. Then, many such orders are queued up, and processed in a first-in, first-out order. When there are sufficient such queued orders, the customer may notice a considerable delay from the time of order initiation to the time of stock delivery confirmation. Thus, business transaction 100 involves at least three possible, and measurable, latency periods: order placement, order validation, and order confirmation/stock transfer confirmation.

One way to measure the latency of the transaction 100 is simply to add the time required to complete all steps of the transaction 100. In this approach, the transaction 100, which spans multiple components, is "stitched" together from individual component requests, in a central processing engine, based on a correlation tag in the individual requests. These correlation tags are provided as part of the request by whatever software routine is used to generate the server request (e.g. WMQ message id) or is injected into the request by a monitoring solution (e.g., http header). For example, if component A (e.g., a servlet) calls component B (e.g., a queue processor), component A passes a unique correlation tag to component B. The unique correlation tag identifies the transaction that spans components A and B. Each component A and B sends an event including the correlation tag to a central processing engine, and the correlation tags allow the central processing engine to stitch the business transaction instances together based on the correlation tags and determine the end-to-end latency.

However, since each request event and business transaction instance is collected, the central processing engine has to process large amounts of data that the central processing engine receives from individual components such as the components A and B. This processing is very CPU and disk resource intensive; data routing over the network is very bandwidth intensive.

Furthermore, the business transaction 100 of FIG. 1, like many Internet-based transactions is asynchronous, meaning that, inter alia, some of the steps overlap in time, such that summing the individual latency periods will result in an inaccurate (and typically too large) latency. By contrast, a synchronous business transaction does not involve an overlap in any steps. These asynchronous/synchronous concepts can be seen with respect to FIG. 2, which will be described later in detail. A simpler way of measuring this latency may be desired. Furthermore, when many business transactions require processing, the amount of data involved can be significant, causing processing delays, among other problems. For large enterprises, there may be thousands of such components, thousands of individual transactions, and hundreds of thousands of instances. Some way to reduce the data transfer and required processing may also be desired.

To improve the latency determination, a method and a corresponding system "stitch" together transactions based on aggregate request data. This aggregate request data periodically (e.g., every five seconds) is collected and totaled at the individual collection components themselves, and the aggregated data are passed to the central processing engine. This method of locally gathering and totaling request data reduces the resource requirements on the central processing engine since with the method, some of the overhead is fanned out to the individual collection components or is avoided altogether (e.g. network overhead is only necessary for the aggregate data instead for each instance of data that comprises the aggregate data).

To acquire the latency data, a diagnostics routine uses profiling technology to intercept Java and .NET methods, and other methods, and measures the latencies associated with the corresponding server requests over one or more business transaction paths. The profiler technology is instantiated in a "probe" that is installed, for example, in each of the backend application servers in the system.

In an embodiment of the system and method, entry points such as servlets, queues, web services, etc., are profiled and turned into "server requests" (e.g., latency is measured for all non-static URLs that flow through a J2EE or .NET application server, and a Server Request is identified by a URL). Other server request technologies include HTTP, RMI, Corba and web services.

In an embodiment, the probe creates five-second aggregates of server requests including minimum individual latencies, maximum individual latencies, total individual latencies, number of errors (e.g., exceptions and faults by type), and the number of server requests for which these metrics are collected and computed.

The method and system uses a correlation tag that contains a time stamp and identifier of a top level server request, which is passed to each outbound call that is made in the context of this top level server request. For example, if a servlet puts a request message into a queue, the servlet creates the correlation tag, containing an identifier and a time stamp, and passes the correlation tag along with the server request payload that goes into the queue. The identifier may be based, for example, on a URL. If the component that receives request messages from the queue is making another outbound call, the original correlation tag (identifier and time stamp) is passed on to the next component.

In simple terms, the method, and corresponding system, for measuring business transaction performance includes, at a top level servlet or entry point, assigning a correlation tag including an original time stamp to a server request, passing the correlation tag with the original time stamp with all outbound calls from the top level servlet to another component, and computing aggregate, minimum, and maximum latency, count, and error metrics over a predetermined interval at the top level servlet and at each component of an outbound call based on the original time stamp.

Figure 2:
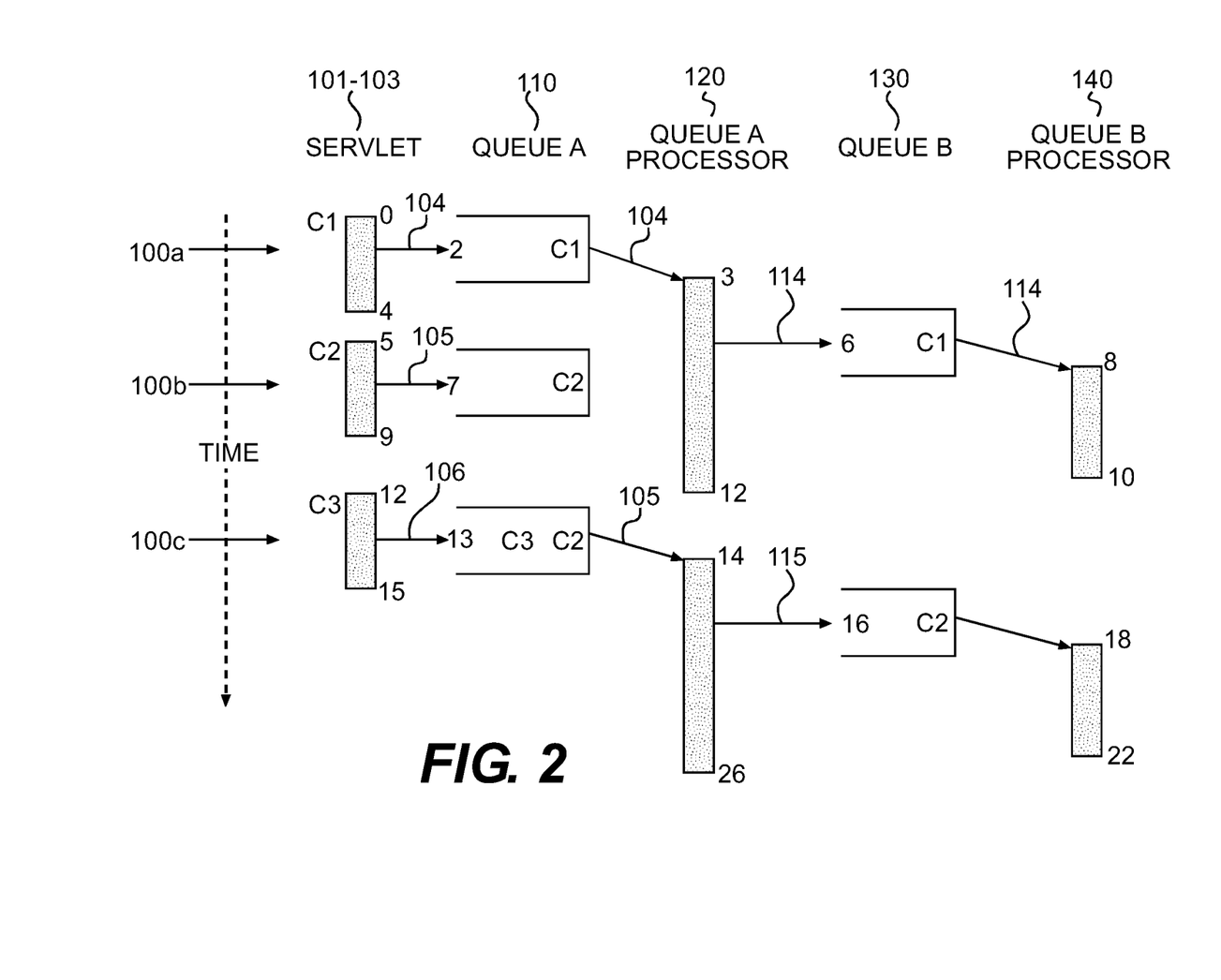
FIG. 2 illustrates, schematically, an exemplary queuing structure for processing the business transaction of FIG. 1.

FIG. 2 illustrates, schematically, an exemplary structure for processing business transaction instances 100a, 100b, and 100c, which are instances of the business transaction 100 of FIG. 1. In FIG. 2, time is shown increasing in the negative y direction, while processing of the business transaction instances proceeds in the positive x direction. Note that in FIG. 2 (and in FIG. 3), the time dimension is a normalized "time unit," rather than any traditional time dimension such as seconds or minutes. Also shown in FIG. 2 are servlet instances 101, 102, and 103, one for each of the business transaction instances 100a, 100b, and 100c; queue A 110 and corresponding queue A processor 120; and queue B 130 with corresponding queue processor 140. The servlet instances and processors may initiate server requests 104, 105, and 106; an 114 and 115, respectively, to the next level of processing. Each such server request includes an original time stamp that corresponds to the time of initiation of processing by the respective servlet instances 101, 102, and 103. That is, for example, server request 104 includes, in addition to the payload of the server request 104, correlation tag (identifier and time stamp) C1, where the correlation tag C1 corresponds to time t=0. This same correlation tag C1 (t=0) is applied to respective follow-on server request 114. Accordingly, and as will be described in more detail with respect to FIG. 3, the latency of business transaction instance 100a processing at the servlet instance 101 is measured from t=0 to t=4; at the queue A processor 120, is measured from t=0 to t=12; and at the queue B processor 140 is measured from t=0 to t=10.

FIG. 2 shows three business transaction instances, each identified by respective correlation tags C1, C2, and C3, being initiated. The correlation tags C1, C2, and C3 serve to identify the top-level server request, and this correlation tag and its corresponding time stamp are passed to each outbound call (e.g., the requests between the servlet instances and the queue A processor 120, and the requests between the queue A processor 120 and the queue B processor 140. At time t=0, servlet instance 101 is invoked to initiate an order for business transaction instance 100a (correlation tag C1), and servlet instance 101 ends at time t=4 (times are relative and not scalable). Servlet instance 102, representing a different business transaction instance 100b initiates at time t=5 and ends at time t=9. Servlet instance 103, representing yet another business transaction instance 100c with correlation tag C3, is invoked between times t=12 and t=15. At time t=2, servlet instance 101 has progressed sufficiently to transmit a server request 104 (e.g., order 14 of FIG. 1), and the order is placed (correlation tag C1) in queue A 110 to await processing by queue A processor 120. At time t=3, the queue A processor 120 begins processing the server request 104 (again, represented by the correlation tag C1 in queue A), and continues processing the server request 104 until time t=12. However, at time t=6, the processing of the server request 104 by queue A processor 120 is sufficiently advanced to allow transfer of server request 114 to queue B 130 (see correlation tag C1 in queue B 130). Finally, the server request 114 (stock purchase order of business transaction 100a) is processed by queue B processor 140 from time t=8 to time t=10.

While queue A processor 110 is processing the business transaction instance 100a (corresponding to correlation tag C1), servlet instance 102 is invoked, starting at time t=5 for business transaction instance 100b. A time t=7, the processing of the servlet instance 102 has proceeded to the point that a server request 105 can be transferred to queue A 110 to await processing by queue A processor 120. However, since, at time t=7 the queue A processor 120 still is processing the server request 104 (for business transaction instance 100a, and corresponding to the correlation tag C1), the queued up server request 105 (corresponding to correlation tag C2) remains in queue. The servlet instance 102 remains invoked until time t=9. At time t 12, servlet instance 103 is invoked to begin processing of business transaction instance 100c (correlation tag C3), and continues until time t=15. At time t=13, processing of the business transaction at servlet instance 103 has proceeded to the point where server request 106 can be transferred to the next stage processor (queue processor 120), and C3 is placed in queue A 110, which still holds server request 105 in queue. Eventually, at time t=14, after processing of server request 104 is complete, the queue A processor 120 extracts server request 105 from queue A 110 and begins processing. At time t=16, data related to business transaction instance 100b is placed in queue B 130, but queue A processor 120 continues processing C2 until time t=26. At time t=18, the server request 115 begins processing in queue B processor 140, and this processing continues until time t=22. The processing between the queue A processor 120 and the queue B processor 140 continues until all business transaction instances 100a, 100b, and 100c are complete.

Because each of the business transaction instances 100a, 100b, and 100c are held in queues for a time, the business transactions instances are asynchronous, and involve definable latency periods. As can be seen from FIG. 2, several of the processing steps overlap in time.

To determine if the processing of a business transaction can be improved (e.g., reduced latency periods), an operator of the stock brokerage may want to know what these latency periods are, and with what part of the backend processing system shown in FIG. 2 are delays most pronounced.

Figure 3:
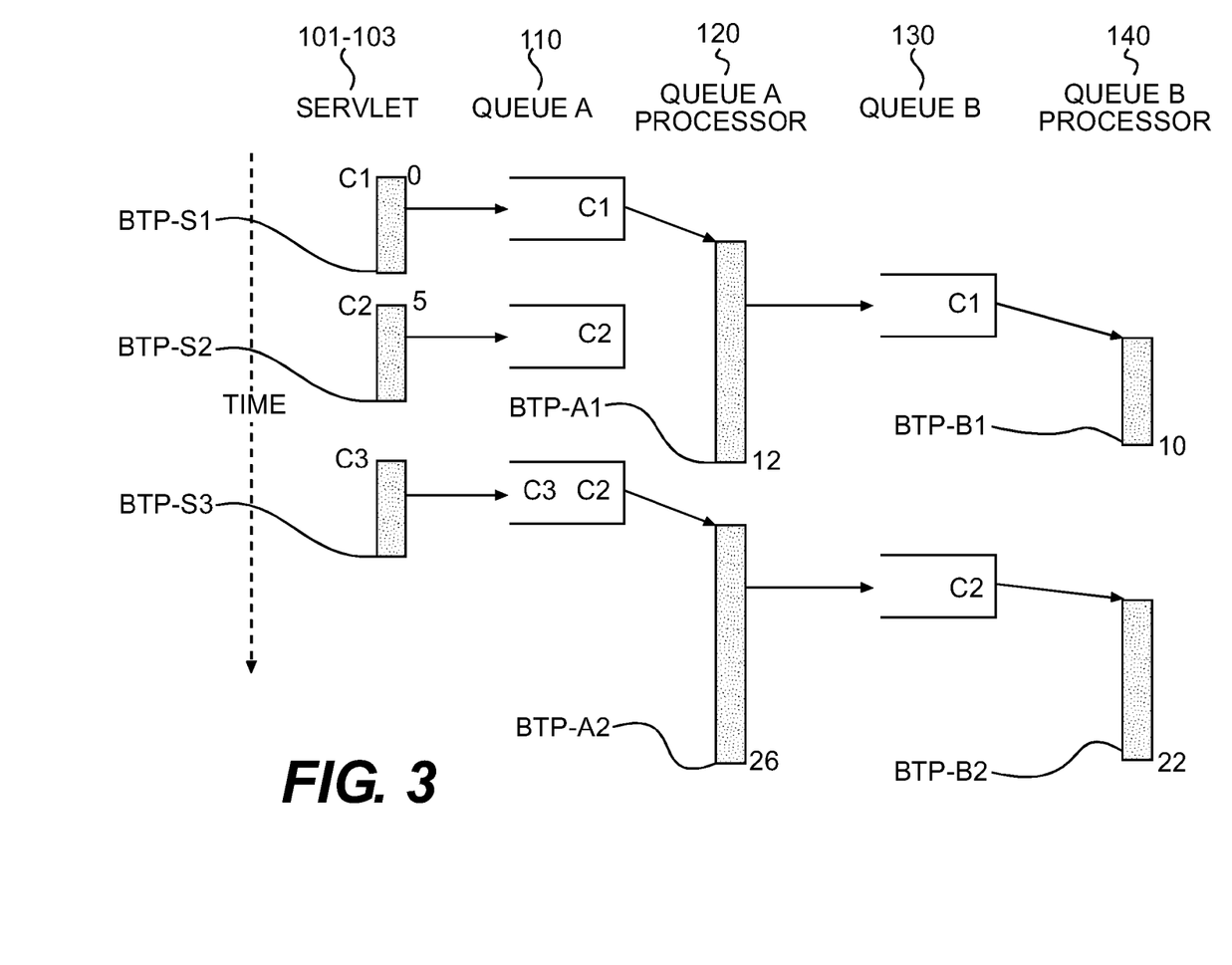
FIG. 3 illustrates, schematically, an exemplary method for gathering latency data related to the business transaction of FIG. 1.

FIG. 3 illustrates, schematically, an exemplary method for gathering and reporting latency data related to the business transaction instances 100a, 100b, 100c of FIG. 2. FIG. 3 shows six distinct latency periods: BTP-S1, BTP-S2, BTP-S3, BTP-A1, BTP-A2, BTP-B1, and BTP-B2. These latency periods refer to the latency of a specific Business Transaction Path (hence BTP) at a particular processor: servlet—S#; queue A processor—A#; and queue B processor—B#. In order to create the aggregate transaction time, the method provides for collecting the "business transaction paths" (BTP) at the end of each method invocation as shown in FIG. 3.

More specifically, BTP instance latency (the latency of a specific business transaction path) is calculated by subtracting the time that is part of the passed correlation tag from the time at the end of the method invocation for each business transaction path. For example, the time associated with BTP-A1 is the time between the end of the first method invocation of queue A Processor 120 and the time when the correlation tag C1 was generated by the servlet instance 101. This time is from t=0 to t=12. Similarly, BTP-B1 represents the time between the end of the method invocation of the queue B processor 140 and the time when correlation tag C1 was generated by the servlet instance 101. Thus BTP-B1 is from time t=0 to time t=10. Since the queue B processor 140 is at the end of the call chain, the BTP-B1 time represents the latency of the first transaction that started in the servlet (correlation tag C1) and ended at the queue B processor 140, in other words, ten time units. Note however, that the latency associated with BTP-A1 is greater than ten time units. Specifically, the BTP-A1 latency is 12 time units.

In a similar fashion, BTP-A2 counts the time from the start of business transaction instance 100b on servlet instance 102 until the completion of processing on the queue A processor 120 (i.e., from time t=5 to time t=26, or a total time of 21 time units). The latency represented by BTP-A2 thus can be seen to include all the wait time of the business transaction instance 100b in queue A 110 and all the processing time at the queue A processor 120.

In a similar fashion, the BTP-B2 latency is seen to be 17 time units, and is less than the BTP-A2 latency. Thus, in the example shown in FIG. 3, the BTPs A1 and A2 are the business transaction paths with the largest latencies, and the sum of these latencies is larger than that of any other summed BTPs.

Each of these BTPs represents the latency of a particular business transaction instance between components (servlet, queue A processor and queue B processor). Each component used in the processing of a business transaction has installed a probe that gathers latency data, total counts and error counts on a periodic basis (for example, every five seconds); computes individual latencies for each BTP, computes a total latency and totals error counters over the time period (i.e., over five seconds); and reports total or aggregate latency, minimum and maximum latencies, and the number of BTPs monitored and a number of error counts, to a central processing engine. The central processing engine gathers the aggregate data from the probes from all components, assigns BTPs to business transactions, and, from the aggregated BTP latencies, calculates and picks the BTP with the highest average latency as a representative latency for the associated business transaction. The central processing engine also identifies and selects the maximum latency from the reported maximum BTP latencies to represent the maximum latency of the business transaction In an embodiment, the central processing engine totals error counters for all BTPs associated with the business transaction instance. The error counters are not forwarded across components and the sum of each error counter represents all errors encountered by the business transaction instance. The total BTP counts are sum of counts of only the BTPs that represent an initiating server request. This allows the business transaction count to represent the number of times the business transaction was initiated. The minimum latency also is taken from the reported minimum BTP latencies.

Although these latency metrics may not have the same time values as metrics calculated by collecting latencies of all business transaction instances centrally, they provide a good approximate measure of business transaction latency and also provide insight as to when business transaction processing slows down and server requests start to queue up. Providing aggregated latencies based on BTPs to the user also helps the user diagnose the exact path and component that is responsible for the slowdown in processing.

Furthermore, using aggregated latency measurements based on BTPs provides a good approximation of business transaction latency without the need for a powerful central processing engine, and without the need for a large network bandwidth. These advantages improve scalability and allows the measurement of all business transaction activity in an application or at a component. In addition, the BTPs themselves provide the ability to diagnose a specific path where processing of a business transaction has slowed, thus allowing identification of the location of processing bottlenecks.

If instead of being asynchronous, the business transaction is synchronous, the same method may be used for determining latency. In synchronous topologies, the transaction time (latency) is simply the latency of the last component.

Figure 4:
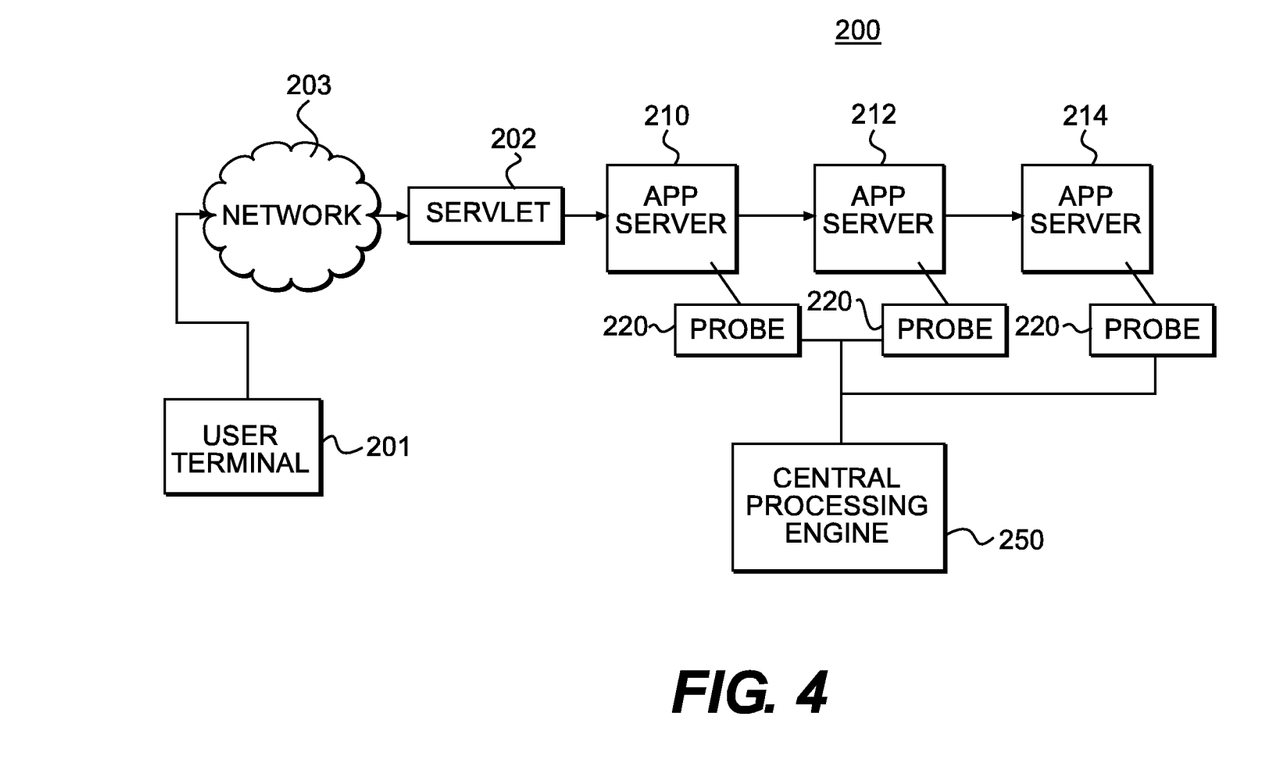
FIG. 4 is a block diagram of an exemplary data processing system to determine business transaction latency according to the method of FIG. 3.

FIG. 4 is a block diagram of an exemplary system architecture 200 for determining business transaction latency using business transaction paths. In FIG. 4, components (application servers) 210, 212, and 214 receive sequential server requests from servlet 202 initiated by way of a network 203, such as the Internet. The sequential server requests initiate in response to a user initiating a business transaction at the user's terminal 201. A probe 220 measures latency and collects metrics at each specific component (i.e., at each of the servlet 202 and the application servers 210, 212, and 214). The probes 220 are software routines executing at a specific component. The probes 220 send the aggregated latency and metric data to central processing engine 250. The central processing engine 250 includes specific programming to determine a representative latency from the data reported by the probes 220, and to provide this representative latency to a system administrator.

Figure 5:
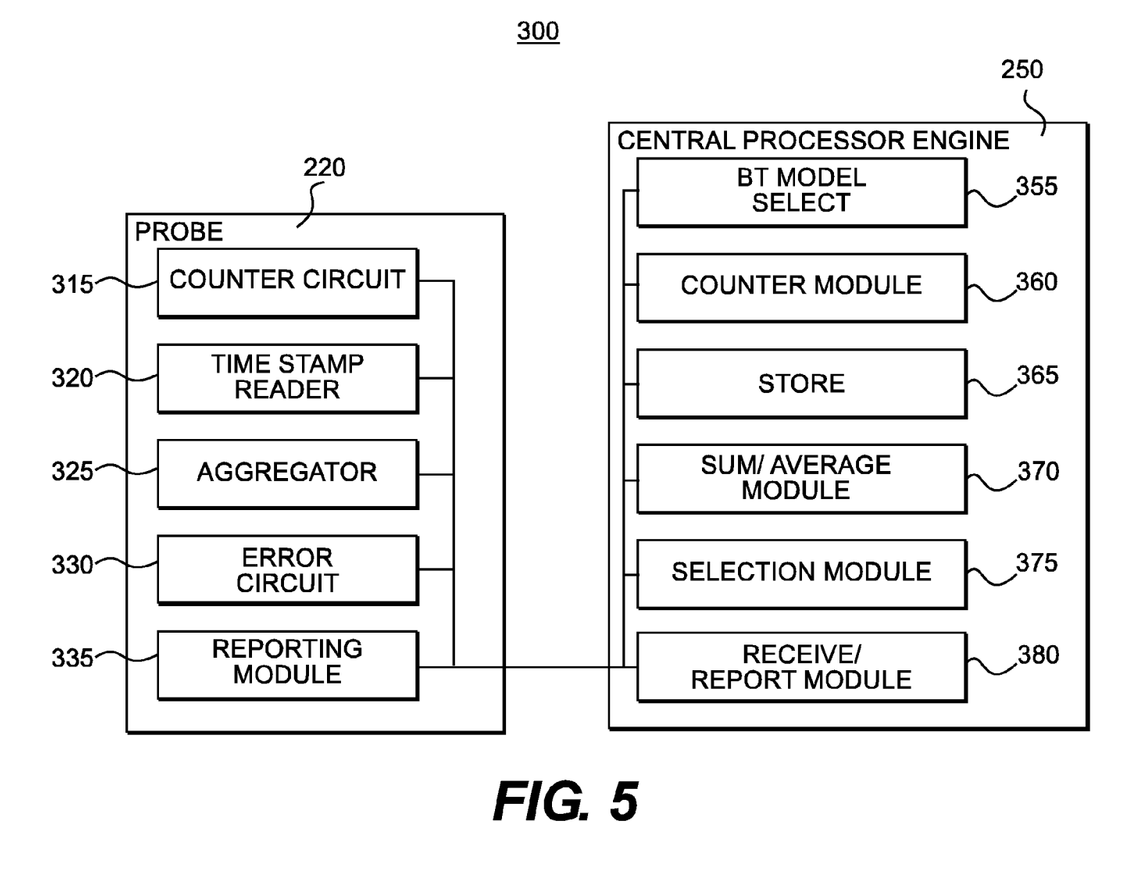
FIG. 5 is a block diagram of an exemplary system that measures business transaction performance.

FIG. 5 is a block diagram of an exemplary system 300 for measuring business transaction performance. The system 300 may be implemented on any number of components, such as on multiple application servers, as well as on a central processor system that monitors operation of the servers. In FIG. 5, probe program 220 is installed on each application server, or distributed component, of a backend system that processes business transactions initiated over a publicly-accessible network such as the Internet. The probe program 220 may be installed as programming on a suitable processor, or may be hard wired, or a combination of the two. Central processor engine 250 also is a software program, and is installed on a suitable processor, for example, at a central location. The central processor engine 250 is in communication with the probe programs 220 (there are as many probe programs 220 as needed to adequately monitor the business transaction). Thus, if a business transaction spans three components (e.g., a servlet and two application servers (see FIG. 2)), each of these three components will have an instance of the probe program installed or available to monitor local execution of the business transaction routines.

In an embodiment, the probe program 220 includes a counter circuit 315, a time stamp reader 320, an aggregator 325, an error circuit 330, and a reporting module 335. The counter circuit 315 runs a software counter that may be set by a user for a specific time, for example, five seconds. The counter circuit includes routines to determine when the counter has reached zero (countdown from five seconds to zero seconds), reset the counter, and notify other elements of the probe program 220 that the counter has reached zero. The time stamp reader 320 reads a starting time stamp attached as part of a server request being processed at the local component. The time stamp refers to the start of the first server request in the business transaction execution, and ordinarily is set at a servlet by the technology associated with that servlet. The aggregator 325 receives a notification from the counter circuit 315 that the pre-defined counter count down time has been reached, at which point, the aggregator gathers certain data related to all server requests that have been processed at the local component during the count down period of the counter. The aggregator then compiles the latency data to achieve a total latency value. The error circuit 330 notes errors (exceptions and faults by type) and keeps a corresponding error count. The reporting module 335 reports the total latency value and the error counters to the central processor engine 250, as well as the number of counts (i.e., server requests or BTPS) processed during the count down period, and the minimum and maximum processing (latency) times.

The central processor engine 250 includes a business transaction selection module 355, a counter module 360 (which may be synchronized with the counter circuit 315), a storage module 365, a sum/average module 370, a selection module 375, and a receive/report module 380. At the central processor engine 250, the receive/report module 380 receives the data sent by the reporting module 335, and provides the data to other elements of the engine 250. The business transaction selection module 355 ensures that the reported server request data conforms to a specific type of business transaction (see FIG. 1, which shows three distinct types of stock trading business transactions). The counter module 360 ensures that the time period covered by the data from the probe program 220 is accorded a correct real-time clock value, if required. The storage module 365 stores historical values of latency data provided by the probe program 220 and as determined at the central processing engine 250. The sum/average module 370 computes the average latency values for the specified time period specified by the counter circuit 315. The sum/average module 370 also may determine an average of all the aggregate average latencies reported by a probe program 220 over a longer time period than that specified by the counter circuit 315. The selection module 375 determines, for a specific business transaction, which of multiple aggregate average latency periods reported by the probe programs 220 is the largest, and designates this largest aggregate latency as representative of the latency of the business transaction for the specific time noted by the counter module 360. Finally, the receive/report module 385 reports the representative latency period to a system administrator.

Figure 6:
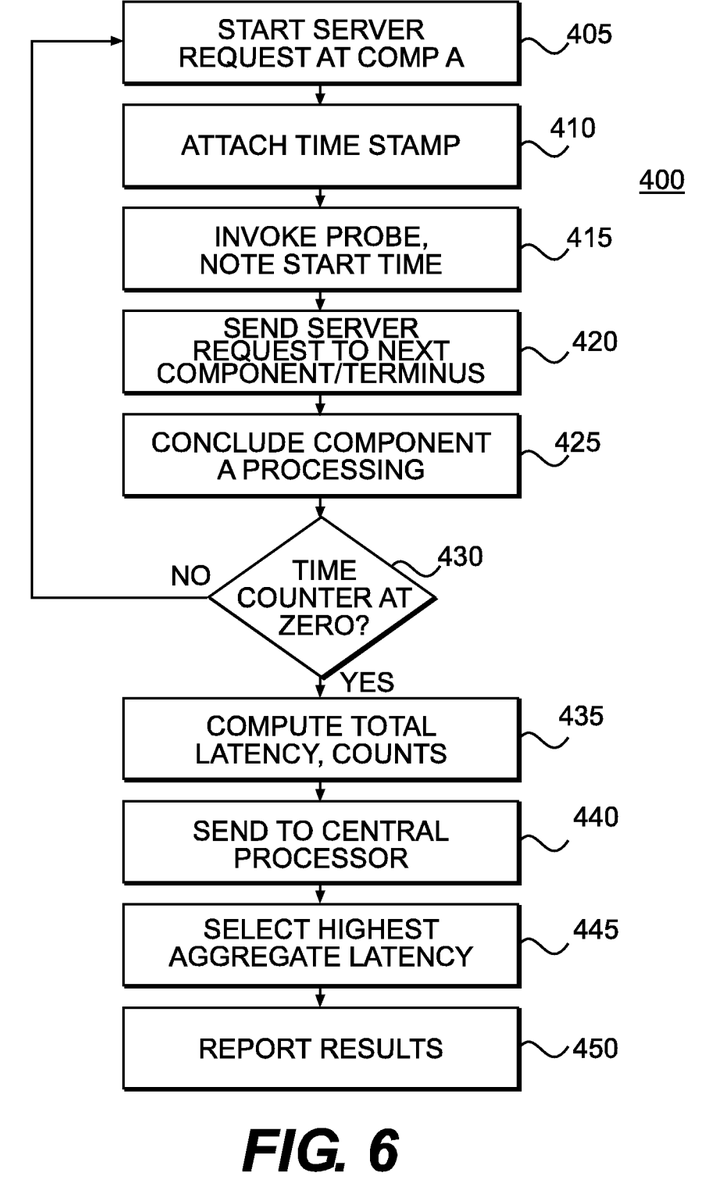
FIG. 6 is a flowchart illustrating an exemplary method for measuring business transaction performance.

FIG. 6 is a flowchart illustrating an exemplary operation for measuring and determining business transaction latency and metrics during processing of the business transaction over a series of related processing components, starting with component A, where component A is the first, or high-level component (e.g., a servlet) or a follow-on application server (e.g., components B-X), for example. In FIG. 6, operation 400 begins in step 405 when a server request representing a business transaction system is started up or received at component A. In block 410, at component A, a monitoring program under control of a probe program is invoked to monitor processing of the business transaction, including noting the time processing commences and the time of sending a server request to a next processing component (e.g., to component B), if required. The monitoring program also notes errors encountered during the processing. In block 415, component A assigns a correlation tag with a starting time stamp and an identifier to the transaction and the probe program notes the assigned correlation tag and start time. In block 420, the server request is sent to the next processing component (component B), with the server request including the correlation tag (identification and time stamp), and the probe program notes the time the server request is sent. In block 425, processing at component A concludes, and the probe program installed at component A notes the elapsed time for the processing at component A. In block 430, the probe program determines if an adjustable time increment counter has counted down (for example, at the expiration of five seconds). If the counter has not counted down, the operation 400 returns to block 405 for additional monitoring, until count down of the counter. In block 435, the time has counted down, and the probe program computes aggregated (total) processing times (latency) for all business transaction paths ending with component A during the time period invoked during count down of the counter. The probe program then sends these aggregated (total) latency values to a central processing engine, block 440.

Following receipt of the aggregated values from each of the reporting components (A, B . . . X) supporting the business transaction, in block 445, the central processing engine selects the highest average aggregated value as representative of the latency of the business transaction. In block 450, the central processing engine reports this latency value to a system administrator.

Using aggregated measurements based on BTPs provide a good approximation for asynchronous and synchronous business transaction latency without the need of a powerful central processing engine. This improves scalability and allows us to measure all transaction activity in an application all the time. In addition, BTPs themselves provide the ability to diagnose the specific path where the slowdown of a transaction is happening.

We claim:

1. A method executed by programming on one or more processors for measuring business transaction performance, comprising:
   at a top-level component, assigning a correlation tag and original time stamp to a server request;
   passing the original time stamp with any server requests from the top-level component to one or more subsequent components; wherein the top-level component and one or more subsequent components form a plurality of business transaction paths;
   computing, at the top-level component and at each subsequent component, an aggregate latency of a corresponding business transaction path of the plurality of business transaction paths over a predetermined interval based on the original time stamp;
   determining first and second average latencies for all business transactions executing during the predetermined interval, wherein a first average latency is measured as a total latency of all the first server requests divided by a total number of first server requests and a corresponding second average latency is measured as a total latency of all the second server requests divided by a total number of second server requests; and
   selecting a larger of the first and second average latency as representative of a latency of the business transaction.

2. The method of claim 1, wherein the pre-determined interval is five seconds.

3. The method of claim 1, wherein the server requests use one of HTTP, Corba, .Net Remoting, RMI, JMS, and web services technologies.

4. The method of claim 1, further comprising computing, at the top-level component and at each subsequent component, and reporting, maximum individual latency time, minimum individual latency time, error counts, and a number of server requests completed during the predetermined interval.

5. The method of claim 1, wherein a business transaction is synchronous and wherein there are no outbound server requests.

6. A method, executed on a suitably programmed processor, for measuring business transaction performance, comprising:
   determining a first total latency for completion of each of a plurality of first server requests over a specified interval by measuring from a start of a first server request to completion of the first server request;
   determining a second total latency for completion of a plurality of second server requests over the specified interval, wherein the second total latency is measured from the start of the first server request to a completion of a corresponding second server request;
   determining first and second average latencies for all business transactions executing during the specified interval, wherein a first average latency is measured as a total latency of all the first server requests divided by a total number of first server requests and a corresponding second average latency is measured as a total latency of all the second server requests divided by a total number of second server requests; and
   choosing a larger of the first and the second average latencies as a representative latency of the business transaction.

7. The method of claim 6, further comprising determining and reporting minimum and maximum latency values and total counts over the specified interval for the first and second server requests.

8. The method of claim 6, wherein the first server request is executed on an entry point component and the second server requests are executed on subsequent components.

9. The method of claim 6, wherein the specified interval is five seconds.

10. The method of claim 6, further comprising assigning a starting time stamp at a start of processing of the first server request.

11. The method of claim 6 further comprising assigning a probe to each component at which a server request is executed, the probe measuring latency values.

12. The method of claim 6, further comprising determining total error counts associated with processing of the server requests.

13. The method of claim 6, wherein the server requests use one of HTTP, .Net Remoting, RMI, JMS, Corba, and web services technologies.

14. The method of claim 6, wherein a business transaction is synchronous.

15. A system, implemented as programming on a processor, comprising:
- a first probe that measures a first elapsed time of completion of a first server request executing on a first component of the system, wherein a start time is appended to the first server request;
- one or more second probes, each second probe measuring a second elapsed time of completion of a second server request executing on a second component of the system, the second elapsed time measured from the start time to completion of the second server request;
- an aggregating and reporting routine coupled to each of the first and second probes, wherein the aggregating and reporting routine determines a first aggregate elapsed time for a plurality of first server requests and a second aggregate elapsed time for a plurality of second server requests completed over a pre-defined interval and reports the aggregated elapsed times to a central processor; and
- the central processor including an averaging and selection routine to determine first and second average latencies for all business transactions executing during the pre-defined interval, wherein a first average latency is measured as a total latency of all the first server requests divided by a total number of first server requests and a corresponding second average latency is measured as a total latency of all the second server requests divided by a total number of second server requests, the central processor to choose a larger of the first and the second average latencies as a representative latency of the business transaction.

16. The system of claim 15, wherein the pre-defined interval is five seconds.

17. The system of claim 15, wherein the server requests use one of HTTP, .Net Remoting, Corba, RMI, JMS, and web services technologies.

18. The system of claim 15, wherein the probes further compute, at each component, and report, maximum individual latency time, minimum individual latency time, and a number of server requests completed during the pre-defined interval.

19. The system of claim 18, wherein the probes further compute and report total error counts.

\* \* \* \* \*